United States Patent
Nakayabu

[19]
[11] Patent Number: 6,072,546
[45] Date of Patent: Jun. 6, 2000

[54] APPARATUS FOR AND METHOD OF MEASURING FOCUS

[75] Inventor: Tomoyasu Nakayabu, Aichi, Japan

[73] Assignee: Sony Corporation, Tokyo, Japan

[21] Appl. No.: 08/919,231

[22] Filed: Aug. 28, 1997

[30] Foreign Application Priority Data

Aug. 30, 1996 [JP] Japan ..................................... 8-230852

[51] Int. Cl.$^7$ .................................................. H04N 3/26
[52] U.S. Cl. .......................... 348/806; 348/380; 348/745; 348/189; 348/180; 348/178; 315/382; 313/382
[58] Field of Search .................................. 348/380, 805, 348/806, 807, 745, 189, 190, 191, 177–178, 184, 180, 657, 658; 315/382, 382.1; 313/382, 389, 414, 452; H04N 3/26

[56] References Cited

U.S. PATENT DOCUMENTS

| | | | |
|---|---|---|---|
| 4,686,429 | 8/1987 | Fendley | 315/368 |
| 5,083,195 | 1/1992 | Evelin | 348/189 |
| 5,334,911 | 8/1994 | Emmoto | 348/189 |
| 5,440,339 | 8/1995 | Harrison et al. | 348/189 |
| 5,526,043 | 6/1996 | Wen | 348/189 |
| 5,621,521 | 4/1997 | Takahashi | 348/180 |
| 5,734,423 | 3/1998 | Wakabayashi | 348/189 |
| 5,777,441 | 7/1998 | Yoshida et al. | 348/189 |
| 5,801,768 | 9/1998 | Sudo et al. | 348/190 |

FOREIGN PATENT DOCUMENTS

| | | |
|---|---|---|
| 2-123876 | 5/1990 | Japan. |
| 6-153011 | 5/1994 | Japan. |

Primary Examiner—John K. Peng
Assistant Examiner—Linus H. Lo
Attorney, Agent, or Firm—Jay H. Maioli

[57] ABSTRACT

A correct estimation of a focussed condition of the cathode ray tube can be performed. A predetermined image (14) is displayed at a predetermined position on a screen of a cathode ray tube. A focussing voltage of the cathode ray tube is varied in a condition that a distance from a reference position to a predetermined position in the image is detected. When the changing state of the detected distance is displayed on a predetermined display means (11a), an optical low pass filter is arranged in the optical system such as the incident part of a sensor (15) or the like. From an output of the sensor (15), a condition is determined as the just-focussed condition, the under-focussed condition or the over-focussed condition and the beam spot diameter is calculated from the detected line width. On the basis of the decision of the under-focussed or the over-focussed condition and the calculated value of the beam spot diameter, a focus quantitative value is obtained.

8 Claims, 10 Drawing Sheets

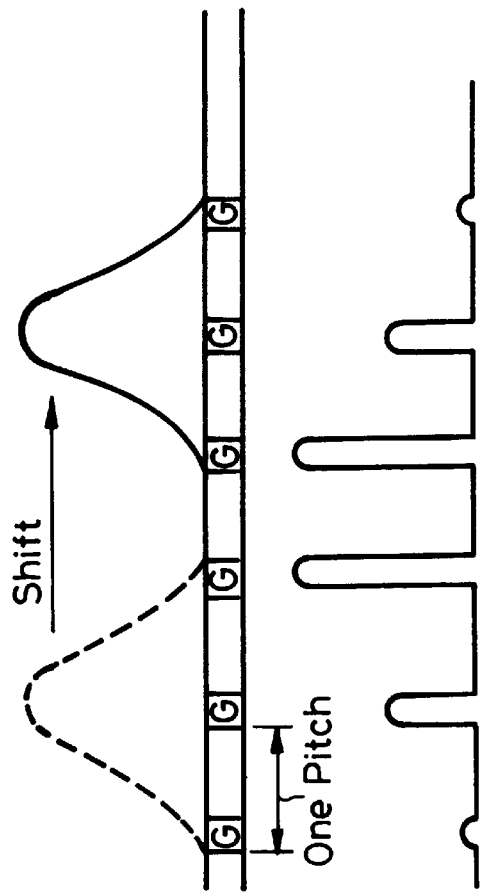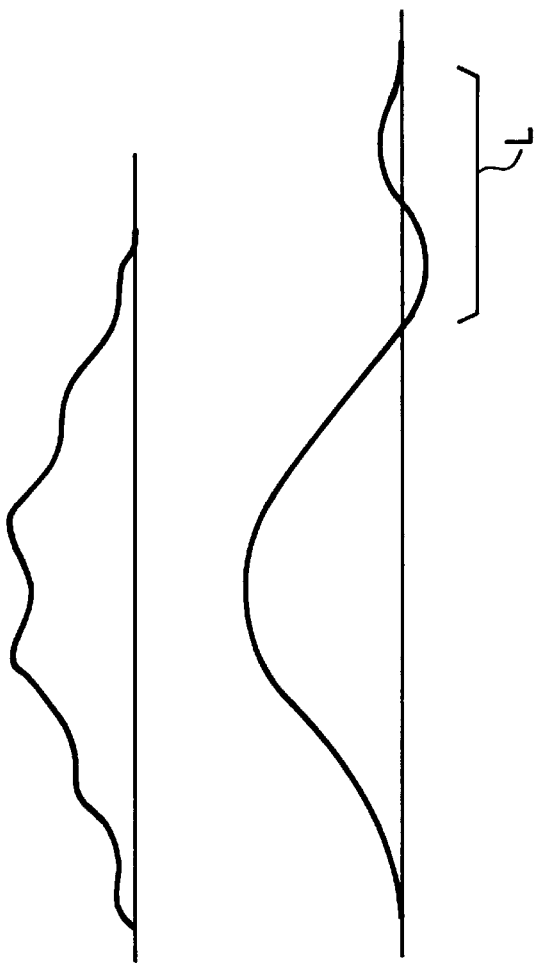
FIG. 1A State of Beam Spot
FIG. 1B Light Emission of Fluorescent Substance
FIG. 1C Output of Line Sensor
FIG. 1D Output of Electric Filter

APPARATUS FOR AND METHOD OF MEASURING FOCUS

BACKGROUND OF THE INVENTION

1. Field of the Invention

The present invention relates to an apparatus for and a method of measuring a focus of a television receiver or a monitoring image receiver using a cathode ray tube.

2. Background of the Invention

A television receiver using a cathode ray tube is required to be adjusted to an appropriate condition by measuring the focus of an electron beam so that a satisfactory picture may be displayed on a screen of the cathode ray tube before shipping it after manufacturing process in a factory. In a conventional method of measuring the focus, an operator used to control a level for focus adjustment of the image receiver while checking by his eye a picture displayed on the cathode ray tube of the image receiver. However, such a method of adjustment has an inconvenient drawback in which an accuracy of the focus adjustment depends on a judgement of the operator because he directly views the picture to estimate the focus, so that the accuracy will not tend to be uniform.

In order to overcome this inconvenience, the present applicant previously proposed a method of measuring a focus in which a displayed picture is detected by a sensor so as to enable a correct measurement of a shape of a beam spot (Pat. application No. 4-304032, etc.)

According to this method of measurement, the picture displayed on the screen of the cathode ray tube is made incident onto a CCD line sensor through a rod lens array for measuring the shape of the beam spot from an output of the CCD line sensor. Specifically, for example, as is shown in FIG. 1A, the beam spot emitting a green light is shifted from a position shown by a broken line to a position shown by a solid line for displaying a bright line having a broad width. Here, a position denoted by G shows a position at which a green fluorescent substance is arranged and it is only this portion that actually emits light. Accordingly, the fluorescent substance emits light in a manner that each position of the green fluorescent substance emits light with a brightness corresponding to the beam spot that passed therethrough, as is shown in FIG. 1B.

If the emitted light of the green fluorescent substance is detected by the line sensor, there is provided an output which is almost proportional to the light emission of the fluorescent substance, as shown in FIG. 1C. Since the output of the line sensor includes a noise component, the output from the line sensor is caused to pass through an electric low pass filter (e.g. a filter formed of a capacitor and a resistor) for obtaining a detected output without the noise component, as shown in FIG. 1D. The bright line width is measured from this detected output and then a processing for measuring a diameter of the beam spot is performed based on that result. By measuring according to the process as shown in FIGS. 1A to 1D, a uniform measurement can be made without any influence from a change of the light emission due to a positional relationship between the fluorescent substance and the beam spot.

However, a ripple is introduced in the output of the line sensor that passed through the low pass filter. Thus, a ripple component L is generated in the output of the low pass filter, as is shown in FIG. 1D. If this ripple component is large, the ripple component itself can be decided to be the detected output of the beam, thereby disturbing the measurement of the bright line width.

In order to eliminate this ripple component, it may be enough to set a passing frequency fc of the low pass filter to an appropriate value. However, since the bright line width of the cathode ray tube is different due to difference of a size of the screen or a mode of scanning of the image receiver to be measured, it is necessary to change the passing frequency fc of the low pass filter whenever the bright line widths of the cathode ray tube differ, which in turn brings an inconvenience in which a configuration of the detector circuit becomes extremely complicated.

SUMMARY OF THE INVENTION

It is an object of the present invention to provide an apparatus for and a method of measuring the focus of the image receiver of this type in which the focus measurement can be performed correctly by a simple operation.

The present invention provides an apparatus for and a method of measuring the focus of the picture displayed on the screen of a video display apparatus having a cathode ray tube, wherein the picture displayed on the screen of an image receiver is detected by a line sensor through a rod lens array and an optical low pass filter and then data of focus measurement is obtained from a signal detected by the line sensor. At this time, in order to make it hard to be affected by a color sorting mechanism (aperture grille, etc.), a beam width of the picture is broadened and a focus of the rod lens array is slightly offset from the screen. At the same time, the optical low pass filter is arranged in an optical system such as an incident part of the line sensor or the like.

On the basis of the output of the line sensor thus obtained, widths of vertical and horizontal lines are displayed in a two-dimensional graph or the like. From the displayed position, etc. a determination of a just-focussed condition to an under-focussed condition or an over-focussed condition is performed. At the same time, a diameter of the beam spot is calculated from the widths of the vertical and horizontal lines, and on the basis of the determination of the under-focussed condition or the over-focussed condition and the calculated value of the diameter of the beam spot, a quantitative value of the focus is acquired.

According to the present invention, since the beam width (bright line width) of a crosshatched image is broadened and an image on the screen is detected by the line sensor through the rod lens array whose focus is slightly offset and the optical low pass filter, it is difficult for a light energy stored in the line sensor to be affected by the aperture grille, etc. and what is close to an actual shape of the beam can be detected for one field period, which in turn leads to a satisfactory focus measurement. Moreover, by obtaining the quantitative focus value on the basis of the determination of the under-focussed condition or the over-focussed condition and the calculated value of the beam spot diameter, it will be possible to judge the correct focussed condition quantitatively.

According to the present invention, since the crosshatched image having the broadened widths of bright lines displayed on the screen of a video display apparatus having a cathode ray tube is detected by the line sensor through the rod lens array slightly out of focus and the optical low pass filter, an optical energy stored in the line sensor approximates an actual shape of the beam, thereby enabling a satisfactory focus measurement to be performed from the displayed image in which the bright line width is broad. At the same time, since the optical low pass filter is provided, the line sensor is able to store the optical energy under a good condition, which in turn leads to a good measurement with high accuracy without any influence from the color sorting mechanism (e.g. aperture grille etc.). In addition, when the optical low pass filter is utilized as in the present invention, as compared with a case where the output of the line sensor is passed through an electric low pass filter, it is not necessary to change the setting due to a difference in an image size and a scanning made of the image receiver to be measured, thus allowing a constantly good measurement to be performed using the same measuring apparatus.

In this case, by applying the tape-like member having the light-diffusing function to the light-receiving surface of the line sensor to form the optical low pass filter, it is possible for the optical low pass filter to be simply fixed.

Also, according to the present invention, since the focus quantitative value is obtained on the basis of the determination of the under-focussed condition or the over-focussed condition and the calculated value of the beam spot diameter, it is possible to decide quantitatively respective adjusted conditions, thereby enabling the focussed condition to be evaluated correctly.

In this case, by finding the focus quantitative value using the predetermined membership function for focus estimation, it is possible to evaluate correctly the focussed condition in consideration of the adjustment data obtained empirically from those skilled in the art and the like.

BRIEF DESCRIPTION OF THE DRAWINGS

FIGS. 1A to 1D are wave form diagrams showing an example of a focus measurement;

DESCRIPTION OF THE PREFERRED EMBODIMENTS

Now, an embodiment according to the present invention will described below with reference to FIG. 2 to FIG. 12.

Figure 2:
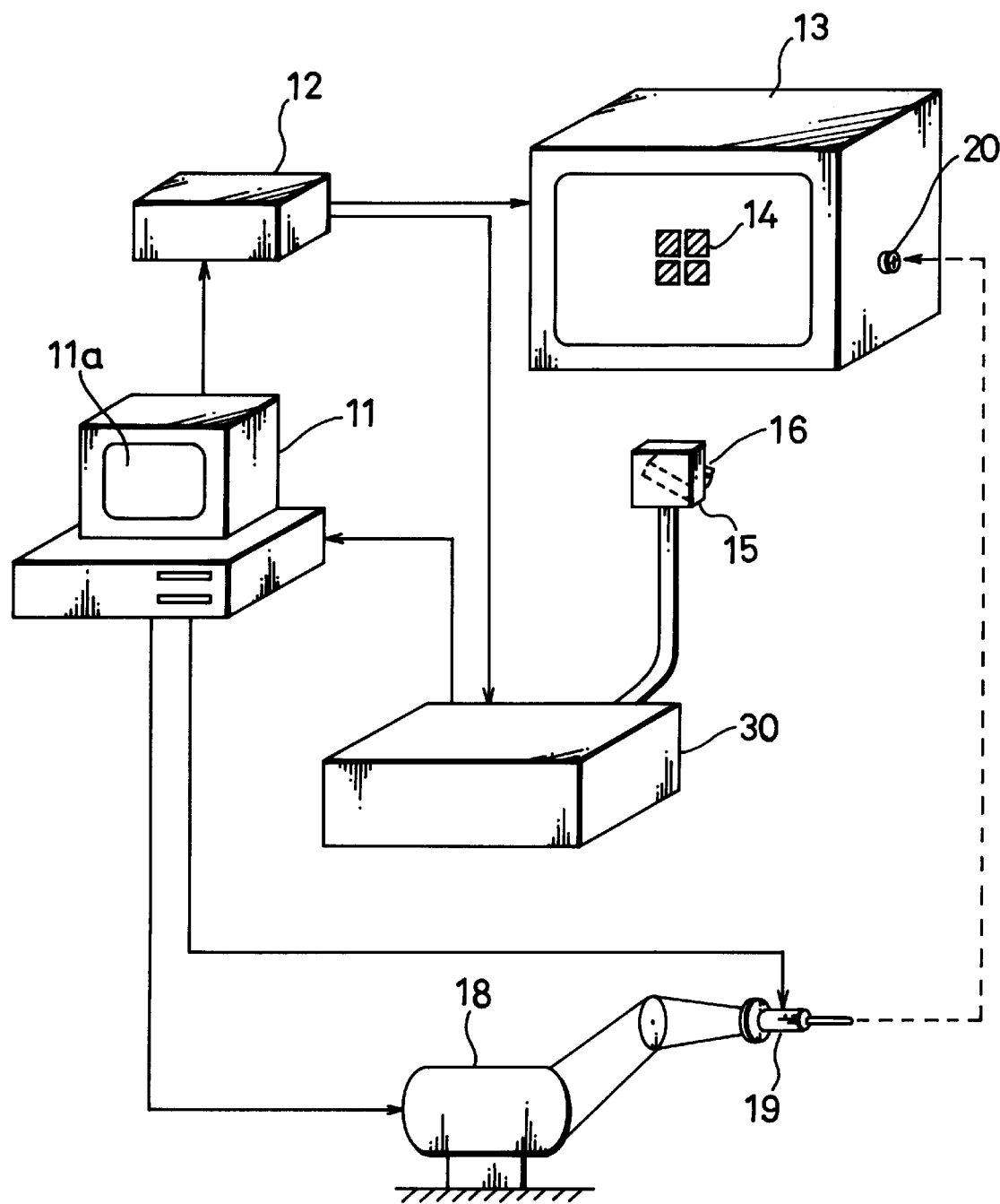
FIG. 2 is a configuration diagram showing an embodiment according to the present invention.
Figure 5:
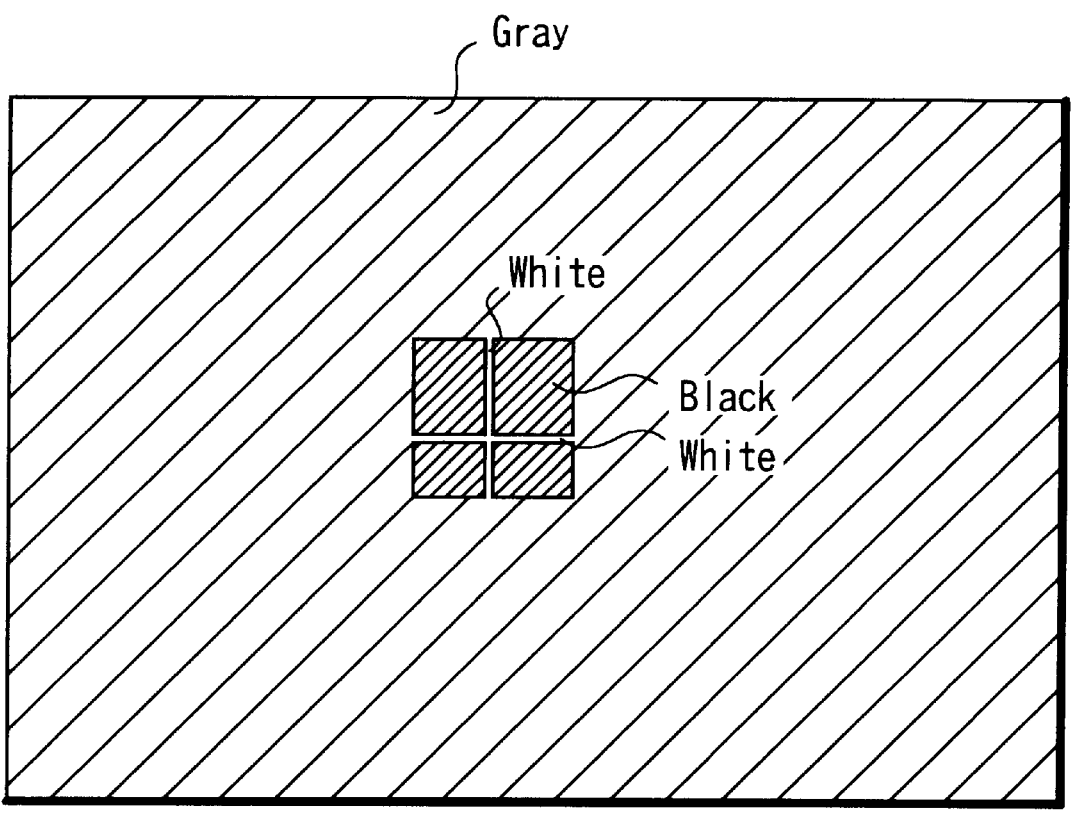
FIG. 5 is an explanatory diagram showing a displayed image during measurement according to the embodiment.

FIG. 2 is a diagram showing a system configuration to which the measuring apparatus and the method according to the present embodiment are applied. Describing a processing to perform the measurement by the configuration shown in FIG. 2, in a case of this embodiment, the focus adjustment is carried out by measuring a crosshatched image 14 displayed on the screen of the cathode ray tube of a television receiver 13. In other words, a measurement control device 11 comprised of a computer device controls a video signal generator 12 for measurement to produce a crosshatching signal for focus adjustment equivalent to a monoscope signal. This crosshatching signal for focus adjustment is supplied to the television receiver 13 as an image signal, and the crosshatched image 14 is displayed on the screen of the television receiver 13. This crosshatched image 14 is, for example, as is shown in FIG. 5, such that only an area in the vicinity where the sensor detects is made black and two crossing vertical and horizontal bright lines with a predetermined width and of a predetermined color are displayed in the black background, and other parts are made gray. A brightness level of the gray part is made variable so as to be equivalent to the monoscope signal. In addition, a light emitting color of the vertical and horizontal lines is made, for example, white (or green and the like colors of light emitting from a single fluorescent substance).

Figure 3:
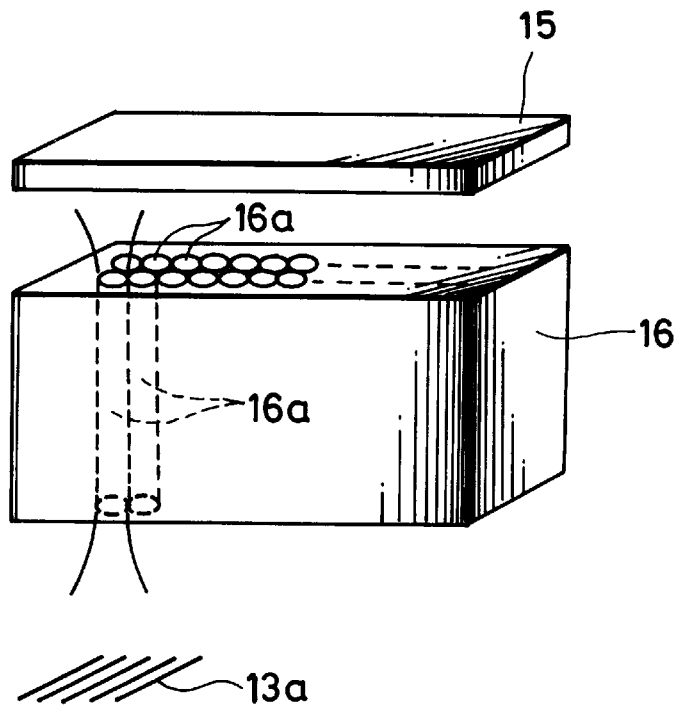
FIG. 3 is an explanatory diagram showing the condition of measuring a screen according to the embodiment.

In this condition, a CCD line sensor 15 to which a rod lens array 16 is mounted is adhered closely to the screen of the television receiver 13 for detecting the vertical and horizontal bright lines in the crosshatched image 14 displayed. At this time, the focus of each lens forming the rod lens array 16 is slightly offset from the screen of the cathode ray tube. Specifically, as is shown in FIG. 3, the rod lens array 16 is comprised of a plurality of cylindrical microlenses 16a arranged linearly and functions as an optical relay member for making the image displayed on a screen 13a of the television receiver 13 incident on the CCD line sensor 15. The focus of each of the microlenses 16a relative to the screen 13a is adjusted so that a position which is slightly offset from the screen 13a may be in focus.

Figure 4:
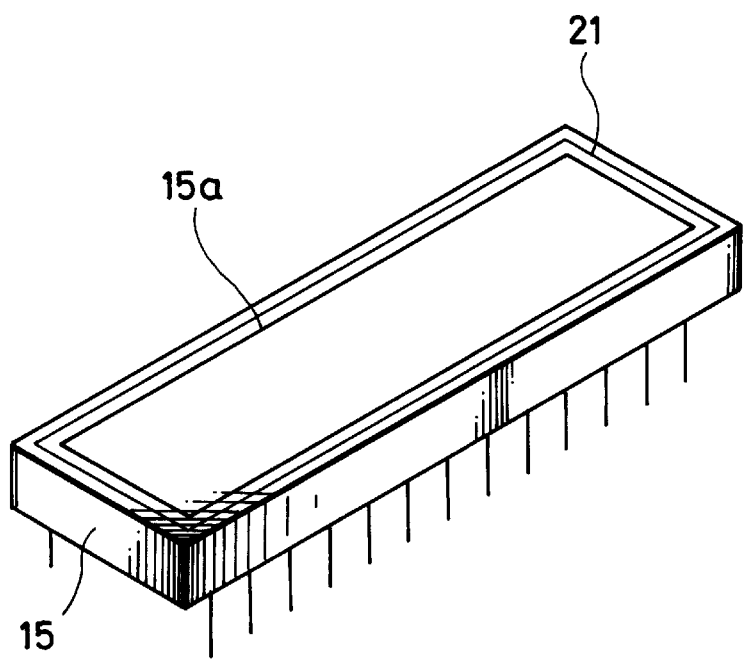
FIG. 4 is a perspective view showing the structure of a sensor according to the embodiment.

The CCD line sensor 15 is comprised of light receivers arranged linearly and reads a signal charge stored in each light receiver and supplies the same to a beam size measuring unit 30 as a detected signal. Here, in this example, as shown in FIG. 4, a light-diffusing tape 21 is applied to the CCD line sensor 15 so as to cover entire light receivers 15a thereof. For this light-diffusing tape 21, what is called a semitransparent adhesive tape (e.g. a tape sold in a trade name of mending tape, etc. made by Sumitomo 3-M corporation) is utilized. By arranging the light-diffusing tape 21 in front of the light receivers 15a, an optical low pass filter is formed which cuts off a higher range component of the light emitted from the rod lens array 16 and the remaining light is made incident on the light receivers 15a.

Furthermore, instead of the light-diffusing tape 21, other materials which function as the optical low pass filter may be arranged. Also, the optical low pass filter may be arranged anywhere in the light path from the screen 13a to the light receivers 15a of the CCD line sensor 15.

Figure 6:
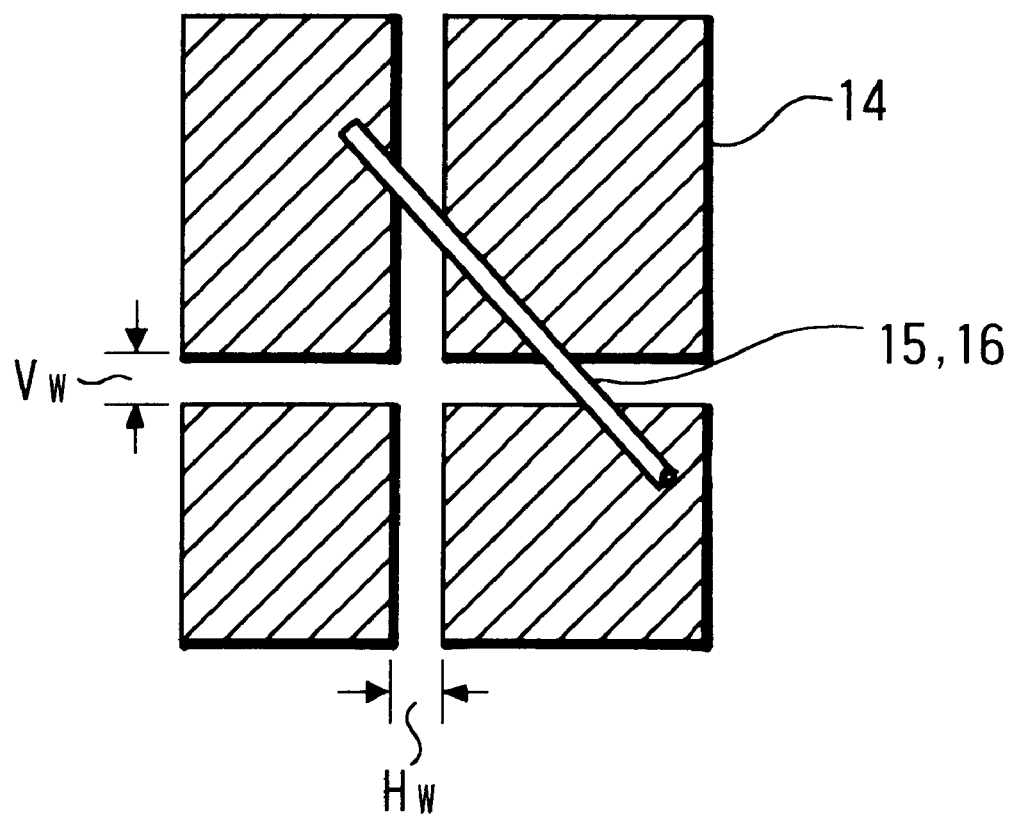
FIG. 6 is an explanatory diagram showing the arranging state of the sensor according to the embodiment.

The beam size measuring unit 30 measures from the detected signal of the line sensor 15 a horizontal width $H_W$ of the vertical line and a vertical width $V_W$ of the horizontal line in FIG. 6. In this case, the measurement process is performed in a manner that the sensor output supplied from the CCD line sensor 15 to the beam size measuring unit 30 is compared with a reference level and then the widths $H_W$ and $V_W$ are measured from a width of a signal that exceeds the reference level.

In addition to these widths $H_W$ and $V_W$, a position $H_L$ from a reference position to an edge of the vertical line and a position $V_L$ from the reference position to an edge of the horizontal line are also measured. These positions $H_L$ and $V_L$ are determined as follows. The timing when the widths $H_W$ and $V_W$ begin to be detected from widths of the vertical and horizontal lines is estimated. Then, distances from a predetermined position (in this case, an end portion) of the CCD line sensor 15 to the respective edges of the vertical and horizontal lines are determined as the positions $H_L$ and $V_L$, respectively.

Particularly, as is shown in FIG. 6, the above measurement is performed in such a manner that the CCD line sensor 15 and the rod lens array 16 are put in an oblique position relative to the vertical and horizontal bright lines of the crosshatched image 14, that is, under a condition that they cross over both of the vertical and horizontal lines. In this condition, the widths $H_W$ and $V_W$ are detected from a width of respective signals when the output signals of the CCD line sensor 15 exceed the reference level, and then the positions $H_L$ and $V_L$ are detected by detecting the distances from one end portion 15a of the CCD line sensor 15 to the respective edges of the widths $H_W$ and $V_W$.

Figure 7:
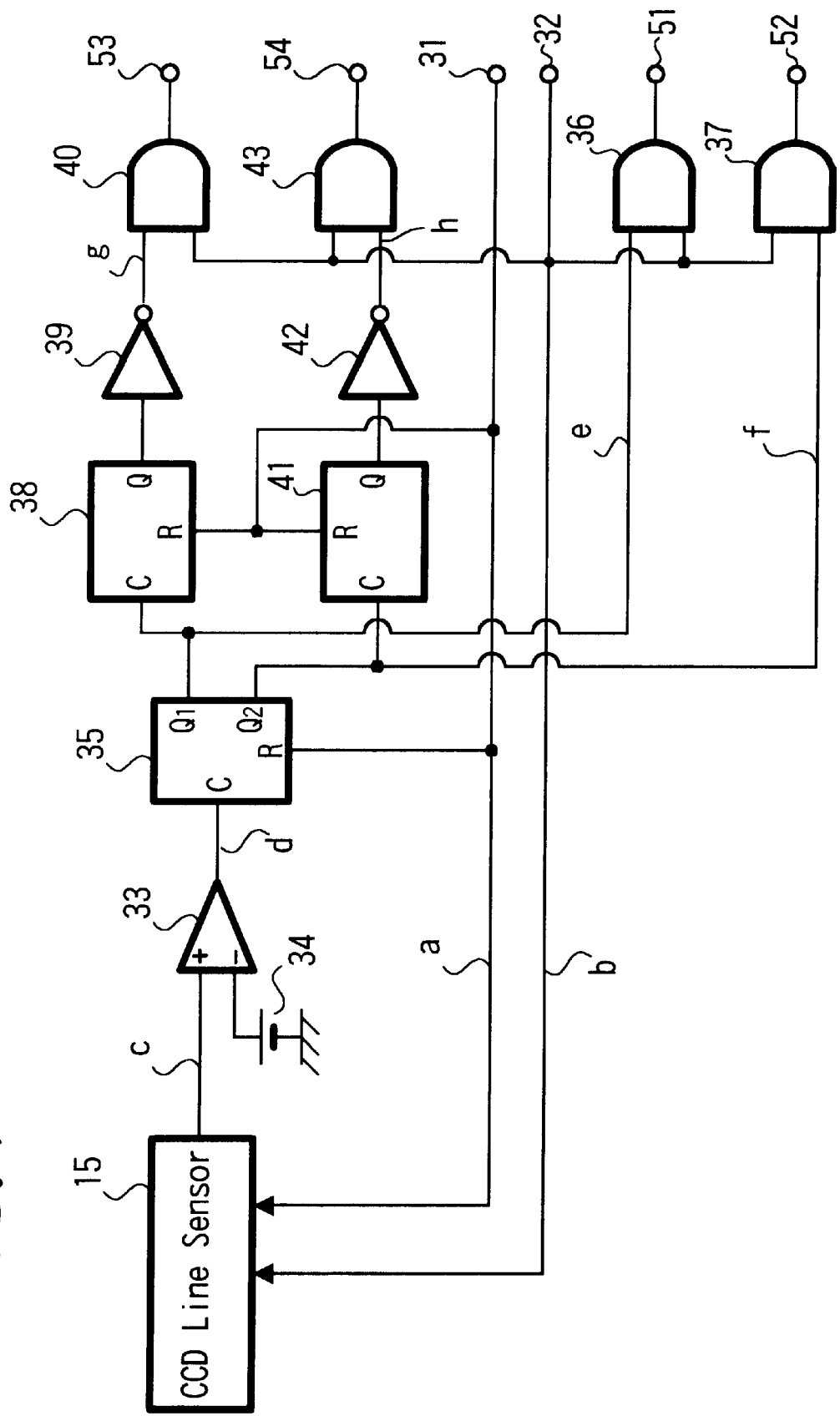
FIG. 7 is a block diagram showing the structure of a detector circuit according to the embodiment.
Figure 8:
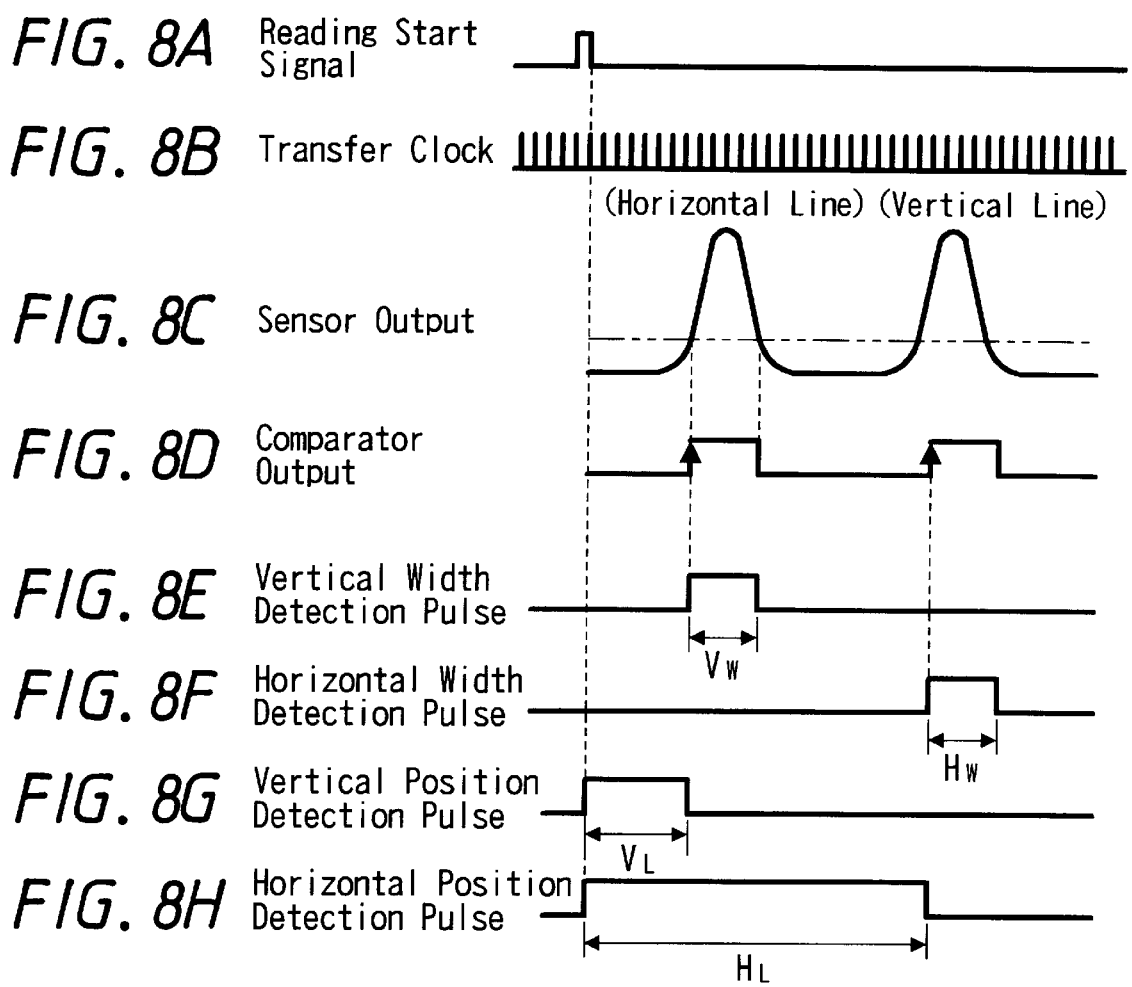
FIGS. 8A to 8H are timing charts showing the focus measuring condition according to the embodiment.

Here, a structure for detecting the widths $H_W$ and $V_W$ as well as the positions $H_L$ and $V_L$ in the beam size measuring unit 30 according to the present embodiment will be described with reference to a block diagram of FIG. 7 and a timing chart of FIG. 7 illustrating its operation. Further, signals denoted in FIGS. 8A, 8B, 8C, 8D, 8E, 8F, 8G, and 8H correspond to signals transferred through signal lines denoted by reference symbols a, b, c, d, e, f, g and h in FIG. 7, respectively.

To begin with, a read start signal (FIG. 8A) is supplied from a terminal 31 at the side of the measuring unit 30 to the CCD line sensor 15 and at the same time a transfer clock signal (FIG. 8B) is supplied thereto from a terminal 32 at the side of the measuring unit 30. A sensor output (FIG. 8C) is read out of the CCD line sensor 15 at a speed synchronized with the transfer clock signal from a time when the read start signal is supplied thereto and then the sensor output is supplied to a positive side input terminal of a comparator 33 within the measuring unit 30. To a negative side input terminal of the comparator 33 is connected a reference voltage source 34. Therefore, the sensor output over a reference level which is a voltage of this reference voltage source 34 is taken out of the comparator 33 as a detected output of the bright line. That is, as shown in FIG. 8D, a pulse which rises to a high level when the bright line is detected and which falls to a low level when the bright line is not detected is output from the comparator 33.

The output of the comparator 33 is then supplied to a vertical/horizontal separator circuit 35. This vertical/horizontal separator circuit 35 receives the read start signal (FIG. 8A) at a reset terminal R as a reset pulse and then supplies to a $Q_1$ output terminal a first pulse received at a pulse input terminal C after the reset pulse has been supplied, and supplies to a $Q_2$ output terminal a second pulse received at the pulse input terminal C. The $Q_1$ output of the vertical/horizontal separator circuit 35 is supplied to one input end of an AND gate 36 as a vertical width detecting pulse (FIG. 8E). This AND gate 36 receives the transfer clock signal from the terminal 32 at the other input end and so the clock signal is output from a terminal 51 connected to the AND gate 36 only when the vertical width detecting pulse rises. A counter (not shown) connected to this terminal 51 counts that clock signal output and thus a value of this count corresponds to the vertical width measured.

The $Q_2$ output of the vertical/horizontal separator circuit 35 is supplied to one input end of an AND gate 37 as a horizontal width detecting pulse (FIG. 8F). This AND gate 37 also receives the transfer clock signal from the terminal 32 at the other input end and so the clock signal is output from a terminal 52 connected to the AND gate 37 only when the horizontal width detecting pulse rises. A counter (not shown) connected to this terminal 52 counts that output clock signal and thus a value of this count corresponds to the measured horizontal width.

The $Q_1$ output of the vertical/horizontal separator circuit 35 is also supplied to a vertical position detector circuit 38. This circuit 38 receives the read start signal (FIG. 8A) at a reset terminal R as a reset pulse and then makes its Q output to rise at a time when the pulse supplied to a pulse input terminal C rises after the reception of the reset pulse. By inverting the Q output of the vertical position detector circuit 38 through an invertor gate 39, as shown in FIG. 8G, a vertical position detecting pulse is obtained for a duration that lasts from the rising time of the read start signal to the rising time of the vertical width detecting pulse. This vertical position detecting pulse is supplied to one input end of an AND gate 40. This AND gate 40 receives at its other input end the transfer clock signal from the terminal 32 and then outputs the clock signal from a terminal 53 connected to the AND gate 40 only when the vertical position detecting pulse rises. A counter (not shown) connected to the terminal 53 counts the output clock signal and its counted value corresponds to the measured vertical position.

Also, the $Q_2$ output of the vertical/horizontal separator circuit 35 is supplied to a horizontal position detector circuit 41. This circuit 41 receives the read start signal (FIG. 8A) at a reset terminal R as a reset pulse and then makes its Q output to rise at a time when the pulse supplied to its pulse input terminal C rises after the reception of the reset pulse. By inverting the Q output of the horizontal position detector circuit 41 through an invertor gate 42, a horizontal position detecting pulse as shown in FIG. 8H, is obtained a duration of which lasts from the rising time of the read start signal to the rising time of the horizontal width detecting pulse. This horizontal position detecting pulse is supplied to one input end of an AND gate 43. This AND gate 43 receives the transfer clock signal from the terminal 32 at the other input end and then outputs the clock signal from a terminal 54 connected to the AND gate 43 only when the horizontal position detecting pulse rises. A counter (not shown) connected to the terminal 54 counts the output clock signal and its counted value corresponds to the measured horizontal position.

The measured data of the horizontal width $H_W$ and the vertical width $V_W$ as well as the horizontal position $H_L$ and the vertical position $V_L$ detected in this way by the counters within the beam size measuring unit 30 are transferred to the measurement control device 11. In addition, the transfer clock signal supplied from the beam size measuring unit 30 to the CCD line sensor 15 is a clock signal generated based on a synchronizing signal received from the generator 12 of a video signal for measurement, thereby enabling the image to be read out by the CCD line sensor 15 in synchronization with the image display on the screen of the television receiver 13.

The measurement control device 11 rotates a stepping motor 19 to vary the focussed condition while estimating the horizontal width $H_W$ and the vertical width $V_W$ as well as the horizontal position $H_L$ and the vertical position $V_L$ indicated by the transferred data. Specifically, the measurement control device 11 controls a bit inserting robot 18 to insert automatically a bit fixed at a tip end of the stepping motor 19 into a focus adjusting volume 20 of the television receiver 13, so as to drive and control the focus adjusting volume 20 by the rotation of the stepping motor 19. Concerning the drive/control at this time, the focus adjusting volume 20 is driven, for example, over such an entire angular range that the focus adjusting volume can be rotated and then the measurement control device 11 stores respective change of each of data $H_W$, $V_W$, $H_L$ and $V_L$ at that time.

Figure 9:
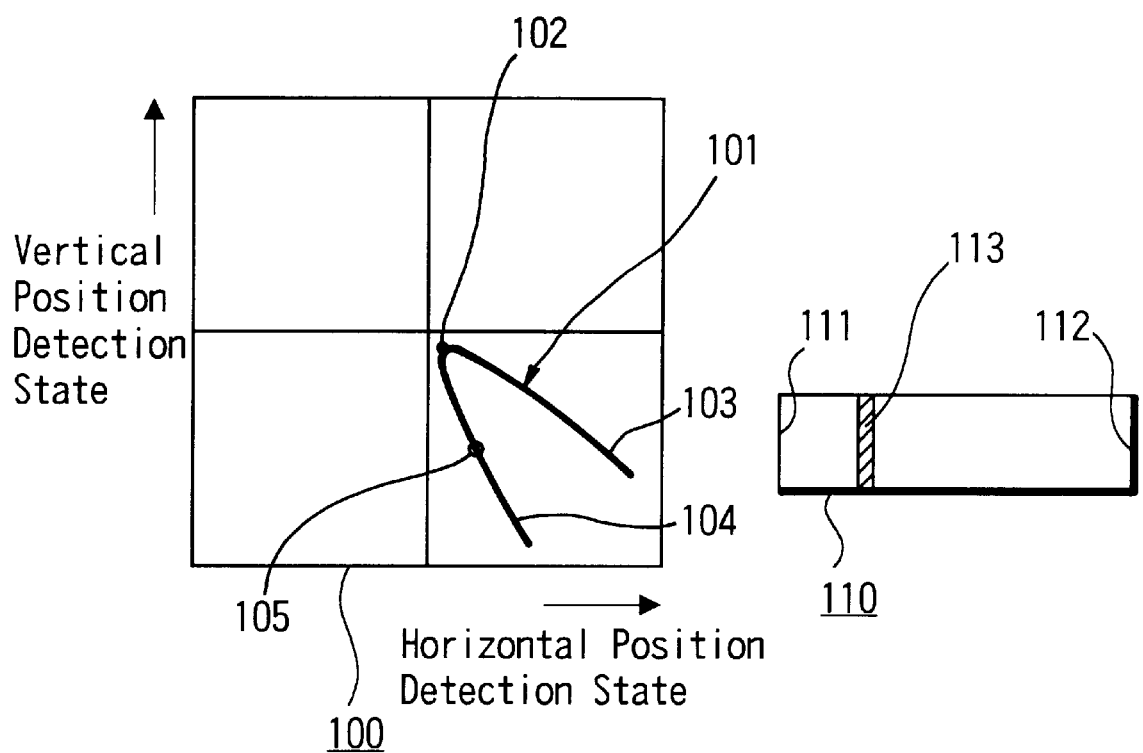
FIG. 9 is an explanatory diagram showing an example of display of focussed condition according to the embodiment.

The measurement control device 11 displays the changing state of each of data $H_W$, $V_W$, $H_L$ and $V_L$ on a screen of a display device 11a connected to the measurement control device 11. FIG. 9 shows an example of the display in this case, in which the changes of the horizontal position $H_L$ and the vertical position $V_L$ are displayed as a graph of horizontal/vertical position 100 and the change of the horizontal width $H_W$ and the vertical width $V_W$ are displayed as a beam area graph 110.

In this case, the graph of horizontal/vertical position 100, in which a vertical axis represents the detected state of the vertical position and a horizontal axis represents the detected state of the horizontal position, indicates changing states of each position on the coordinate axis composed of orthogonal vertical and horizontal axes. A curve 101 of change shown on the graph of horizontal/vertical position 100 is a changing curve obtained by varying the rotation of the focus adjusting volume 20. Generally, the vertical position $V_L$ has the maximum value at a certain adjusted position, while the horizontal position $H_L$ has the minimum value at the certain adjusted position. This position is represented as a minimum point 102 and it is denoted by a mark (here, a solid circle) displayed. This minimum point 102 forms a boundary between a characteristic curve 103 representing the under-focussed condition and a characteristic curve 104 representing the over-focussed condition. A detected position along the curve of change 101 for the current rotated position of the volume 20 is displayed as a current point 105 (here, an open circle).

The beam area meter 110 displays the detected data of the horizontal and vertical widths $H_W$ and $V_W$ as a beam area obtained by multiplying these data within the measurement control device 11. A left end of the meter 110 is denoted as a minimum point 111 and a right end is denoted as a maximum point 112. A beam area for the current adjusted position of the volume 20 is displayed as a current point 113 in a predetermined mode between the minimum point 111 and the maximum point 112.

By displaying the focussed condition measured in this manner, it will be possible to estimate correctly the changing state of focus of the beam of the cathode ray tube of the television receiver 13 which is an equipment to be adjusted. In other words, by observing the current point 105 along the curve of change 101 displayed as the graph of horizontal/vertical position 100, it will be possible to decide readily whether the current focussed condition is the under-focussed one or the over-focussed one.

Moreover, in this example, on the basis of the estimation of the under-focussed condition or the over-focussed condition based on the display of the focussed condition and the diameter of the beam spot found from the data of the horizontal width $H_W$ and the vertical width $V_W$ which are the detected bright line widths, a processing to find the focus quantitative value is performed within the measurement control device 11 for displaying that focus quantitative value found on the screen of the display 11a connected to the measurement control device 11. Here, the diameter of the beam spot is found from the following expression using the data of the horizontal width $H_W$ and the vertical width $V_W$ detected.

$$\text{Diameter of beam spot} = (H_W^2 + V_W^2)^{1/2} \tag{1}$$

Figure 10:
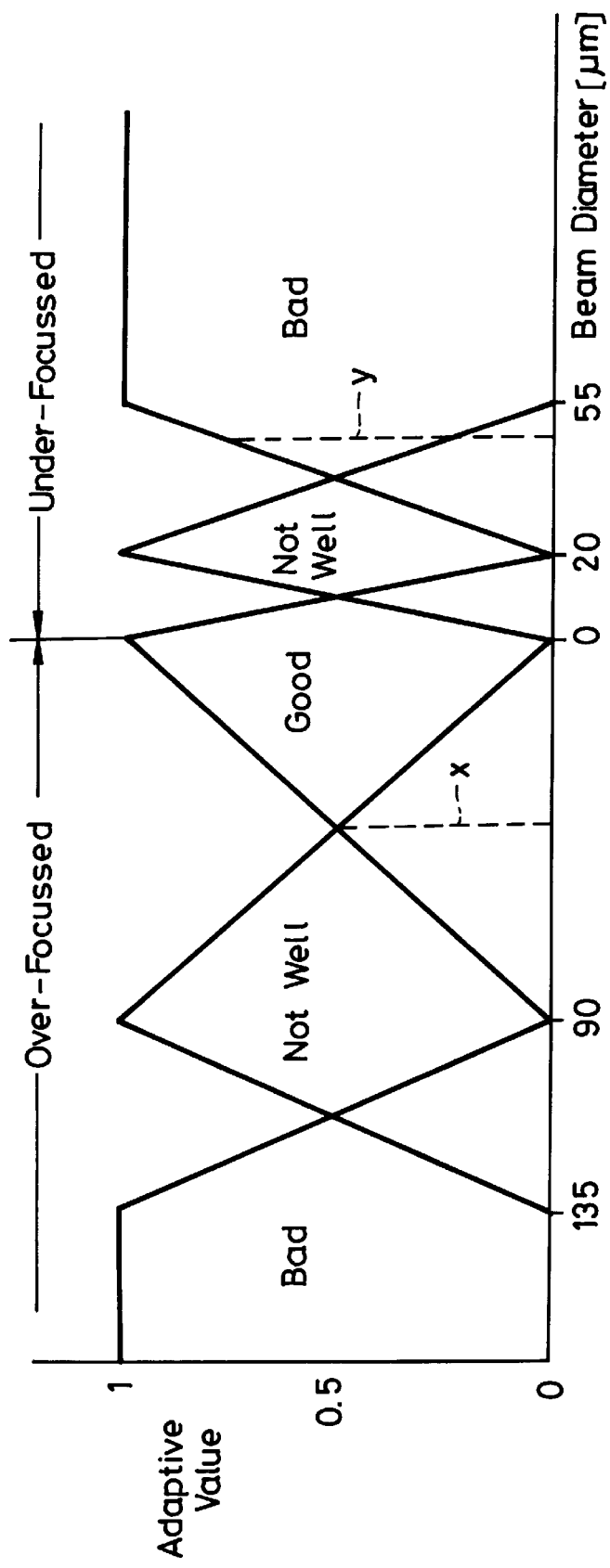
FIG. 10 is an explanatory graph showing a focus membership function to be applied to the embodiment.

For the processing to find the focus quantitative value from the calculated diameter of the beam spot and the estimation of the under-focussed or over-focussed condition, a membership function for focus estimation is utilized. Data of this membership function for focus estimation is previously stored in the measurement control device 11. FIG. 10 shows an example of the membership function for focus estimation to be used in the present embodiment. The membership function for focus estimation has been established as follows. A plurality of those skilled in the focus adjusting operation were made to perform the focus adjustment of a standard cathode ray tube. During the adjusting operation, three steps of adjusted condition of ① good, ② not well and ③ bad were set for allowing respective ranges to be empirically determined, in which ranges of the three steps of adjusted conditions of good, not well and bad regarding the diameter of the beam spot could be estimated from respective focussing voltages, etc. during the adjustment.

In FIG. 10, a horizontal axis represents a difference from the minimum value of the beam spot diameter. A position indicated by 0 μm represents a beam spot diameter at the just-focussed position (i.e. corresponding to the minimum point 102 in FIG. 9). The left side from this position represents the over-focussed condition while the right side from this position represents the under-focussed condition. A vertical axis represents an adaptive value to be used for finding the focus quantitative value.

Figure 11:
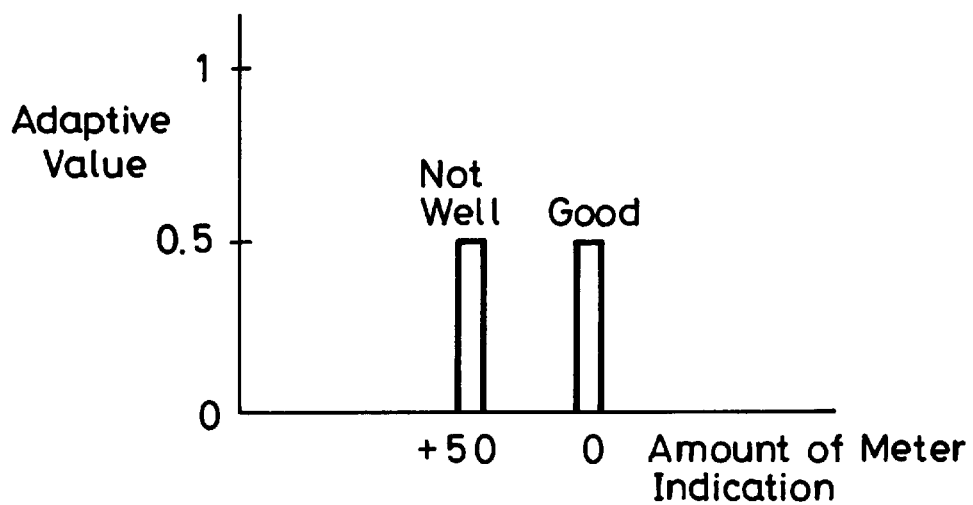
FIG. 11 is an explanatory graph showing the values of the membership function in a measuring example (an example of an over-focussed condition and offset by 45 $\mu$m) according to one embodiment.
Figure 12:
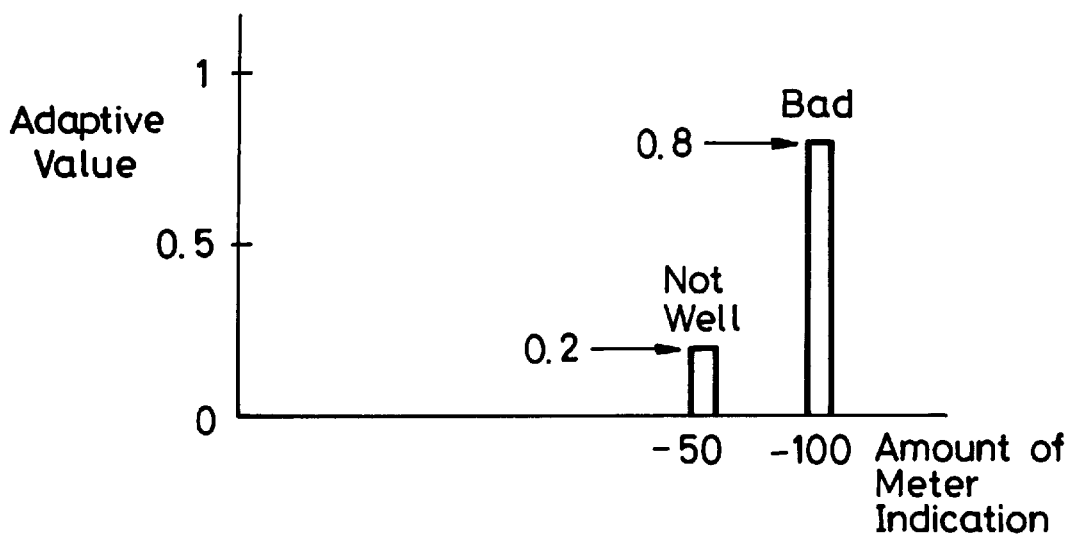
FIG. 12 is an explanatory graph showing the values of the membership function in a measuring example (an example of an under-focussed condition and offset by 45 $\mu$m) according to the embodiment.

Next, a processing for finding the focus quantitative value using the membership function for the focus estimation will be described with reference to FIG. 11 and FIG. 12. The focus quantitative value in this example is a value which changes within a range form +100 to −100. As a premise for finding the focus quantitative value, a calculated value of zero is set for the good focus-adjusted condition, a calculated value +50 is set for the not well focussed condition in the over-focussed condition and a calculated value of +100 is set for the bad focus-adjusted condition. Also, a calculated value −50 is set for the not well focus-adjusted condition in the under-focussed condition and a calculated value of −100 is set for the bad focus-adjusted condition.

Firstly, an example of finding the focus quantitative value when a measured diameter of the beam spot is in the over-focussed condition by 45 μm from the just-focussed position will be described. In the membership function of FIG. 10, for a position offset by 45 μm in a direction of the over-focussed condition (in FIG. 10, a position denoted by a broken line of x), the adaptive value of the good focus-adjusted condition is 0.5 and at the same time the adaptive value of the not well focus-adjusted condition is 0.5. Accordingly, as is illustrated in FIG. 11, an adaptive value 0.5 corresponds to the position of a value 0, and an adaptive value 0.5 corresponds to the position of a value +50. Subsequently, a processing for finding a center of gravity of these adaptive values is carried out. In other words, the center of gravity is found by calculating the following expression and the value of the center of gravity is determined to be the focus quantitative value for the 45 μm over-focussed condition from the just-focussed position.

$$\frac{(+50 \times 0.5) + (0 \times 0.5)}{(0.5 + 0.5)} = +25 \tag{2}$$

From this expression, the focus quantitative value for the 45 μm over-focussed condition from the just-focussed condition will become +25 and this focus quantitative value +25 is displayed on the screen 11a as a meter indication.

Secondly, an example of finding the focus quantitative value when a measured diameter of the beam spot is in the under-focussed condition by 45 μm from the just-focussed position will be described. In the membership function of FIG. 10, for a position offset by 45 μm in a direction of the under-focussed condition (in FIG. 10, a position denoted by a broken line of y), the adaptive value of the not well focus-adjusted condition is 0.2 and at the same time the adaptive value of the bad focus-adjusted condition is 0.8. Accordingly, as is illustrated in FIG. 12, the adaptive value 0.2 corresponds to the position of a value −50 and the adaptive value 0.8 corresponds to the position of a value −100. Subsequently, a processing for finding a center of gravity of these adaptive values is carried out. In other words, the center of gravity is found by calculating the following expression and the value of the center of gravity is determined to be the focus quantitative value for 45 μm under-focussed condition from the just-focussed position.

$$\frac{(50 \times 0.2) + (-100 \times 0.8)}{(0.2 + 0.8)} = -90 \qquad (3)$$

From this expression, the focus quantitative value for the 45 μm under-focussed condition from the just-focussed condition will become −90 and this focus quantitative value −90 is displayed on the screen 11a as a meter indication.

By displaying the focus quantitative value found in this way as a meter indication, it is possible to estimate a current focus-adjusted condition quantitatively. In other words, when the focus quantitative value is zero, the just-focussed condition is obtained and it is found that as the value approaches +100, the focussed condition becomes gradually worse in the direction of the over-focussed condition and as the value approaches −100, the focussed condition becomes gradually worse in the direction of the under-focussed condition. Therefore, when estimating only by the beam spot diameter, there is a large difference in merit between the direction of the over-focussed condition and the direction of the under-focussed condition even in a case where its difference has the same value. However when the focus quantitative value is found by applying the membership function as in the present example, it will be possible to estimate the focussed condition quantitatively.

While, in the above embodiment, the processing which performs one measurement by means of the image displayed at a predetermined place in the cathode ray tube is explained, the image for measurement (in the above embodiment, the crosshatched image) may be displayed at a plurality of places on the screen for measuring the focussed condition at a plurality of places, thereby performing an adjustment in consideration of a balance of the entire screen to an appropriate focussed condition from an overall viewpoint. In this case, for example, it is conceivable to adjust so that the total focus quantitative value may fall to the minimum value on the whole screen.

Moreover, while, in the above embodiment, the adjustment is performed by rotating the focus adjustment volume 20 of the television receiver 13, if a television receiver to be adjusted comprises a memory for storing the focus control value and the focus control is performed on the basis of the control data stored in this memory, the control data of the memory needs only to be rewritten based on the measured data, so that the configuration for adjustment can be made simpler.

Furthermore, while, in the above embodiment, the measurement of the focus of the cathode ray tube of the television receiver is performed, the present invention is of course applicable to the measurement of a focus of other image display devices having the cathode ray tube (e.g. a display for computer etc.).

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A focus measuring method measuring a focus of a picture displayed on a screen of a video display apparatus having a cathode-ray tube by employing a measuring apparatus having a rod lens array and a line sensor, comprising the steps of:

applying a tape-like member forming an optical low-pass filter to a light-receiving surface of said line sensor for performing a light diffusion function;

detecting said picture displayed on said screen of said video display apparatus having said cathode-ray tube by said line sensor through said rod lens array and said optical low-pass filter;

obtaining focus measurement data from a signal detected by said line sensor; and analyzing the focus measurement data using an empirically derived membership function.

2. The focus measuring method according to claim 1, wherein a focus adjustment picture having a bright line with wide widths in vertical and horizontal directions is employed as said picture displayed on said screen of said video display apparatus having said cathode-ray tube.

3. The focus measuring method according to claim 1, wherein said rod lens array is formed by arranging cylindrical lenses adjacent to each other and in lines.

4. The focus measuring method according to claim 1, wherein said picture displayed on said screen of said video display apparatus having said cathode-ray tube is detected by displacing a focus of each of said lenses forming said rod lens array from said screen of said video display apparatus.

5. A focus measuring method of measuring a focus of a picture displayed on a screen of a video display apparatus having a cathode-ray tube by utilizing a line sensor and a rod lens array, comprising the steps of:

applying a tape-like member forming an optical low-pass filter to a light-receiving surface of said line sensor for performing a light diffusion function;

detecting a focus adjustment picture having a bright line with widths in vertical and horizontal directions and displayed on said screen of said video display apparatus having said cathode-ray tube by said line sensor through said rod lens array and said optical low-pass filter;

calculating a diameter of a beam spot based on vertical and horizontal line widths detected by said line sensor to determine whether a condition of said beam spot is an under-focussed or an over-focussed condition relative to a just-focussed condition;

calculating, when it is determined that said condition of said beam spot is said under-focussed condition, a calculated value of said diameter of said beam spot with a function prepared for said under-focussed condition to obtain a first focus quantitative value;

calculating, when it is determined that said condition of said beam spot is said over-focussed condition, a calculated value of said diameter of said beam spot with a function prepared for said over-focussed condition to obtain a second focus quantitative value; and employing an empirically derived membership function for obtaining one of said first and second focus quantitative values from a calculated value of said diameter of said beam spot based on a result of a determination whether said condition of said beam spot is said under-focussed condition or said over-focussed condition.

6. The focus measuring method according to claim 5, wherein a focus control is carried out based on control data stored in a memory of said video display apparatus having said cathode-ray tube for storing a focus control value and a focus adjustment is carried out with said control data stored in said memory being replaced with a measured data.

7. The focus measuring method according to claim 5, wherein said rod lens array is formed by arranging cylindrical lenses adjacent to each other and in lines.

8. The focus measuring method according to claim 5, wherein said focus adjustment picture having said bright line with said wide widths in vertical and horizontal directions and displayed on said screen of said video display apparatus having said cathode-ray tube is detected by displacing a focus of each lens forming said rod lens array from said screen of said video display apparatus.

* * * * *